United States Patent
Hu

(10) Patent No.: US 12,364,893 B2
(45) Date of Patent: Jul. 22, 2025

(54) FIRE-FIGHTING FOAM CONCENTRATE WITH SILICONE SURFACTANT

(71) Applicant: Tyco Fire Products LP, Lansdale, PA (US)

(72) Inventor: Michelle Hu, Oconto, WI (US)

(73) Assignee: Tyco Fire Products LP, Cranston, RI (US)

( * ) Notice: Subject to any disclaimer, the term of this patent is extended or adjusted under 35 U.S.C. 154(b) by 401 days.

(21) Appl. No.: 17/907,815

(22) PCT Filed: Mar. 1, 2021

(86) PCT No.: PCT/IB2021/051701
§ 371 (c)(1),
(2) Date: Aug. 29, 2022

(87) PCT Pub. No.: WO2021/191706
PCT Pub. Date: Sep. 30, 2021

(65) Prior Publication Data
US 2023/0087991 A1    Mar. 23, 2023

Related U.S. Application Data

(60) Provisional application No. 63/000,698, filed on Mar. 27, 2020.

(51) Int. Cl.
| | | |
|---|---|---|
| *A62D 1/02* | (2006.01) | |
| *A62C 5/02* | (2006.01) | |
| *A62D 1/00* | (2006.01) | |
| *C09K 23/54* | (2022.01) | |

(52) U.S. Cl.
CPC .............. *A62D 1/0071* (2013.01); *A62C 5/02* (2013.01); *A62D 1/0042* (2013.01); *C09K 23/54* (2022.01)

(58) Field of Classification Search
CPC ...... A62D 1/0071; A62D 1/0042; A62C 5/02; A62C 99/0036; C09K 23/54
See application file for complete search history.

(56) References Cited

U.S. PATENT DOCUMENTS

| | | | |
|---|---|---|---|
| 2008/0196908 A1* | 8/2008 | Schaefer | .................... C08J 9/30 169/46 |
| 2016/0166867 A1 | 6/2016 | Hansen et al. | |
| 2019/0262647 A1 | 8/2019 | Havelka-Rivard et al. | |
| 2019/0321670 A1 | 10/2019 | Ananth et al. | |
| 2020/0171334 A1* | 6/2020 | Xie | ........................ C07F 7/0838 |

FOREIGN PATENT DOCUMENTS

| | | |
|---|---|---|
| CN | 109364421 A | 2/2019 |
| CN | 110523044 A | 12/2019 |
| CN | 110639156 A | 1/2020 |
| WO | WO-2017/161162 A1 | 9/2017 |

OTHER PUBLICATIONS

Korean Intellectual Property Office as International Searching Authority; International Search Report and Written Opinion; International Application No. PCT/IB2021/051701; mailed Jun. 7, 2021; 13 pages.

* cited by examiner

*Primary Examiner* — Andrew J. Oyer
(74) *Attorney, Agent, or Firm* — Foley & Lardner LLP

(57) ABSTRACT

An aqueous composition, which can be diluted with an aqueous diluent to provide a foam precursor composition, is provided. The foam precursor composition can be aerated to form a firefighting foam. The present aqueous firefighting compositions include a surfactant mixture containing a siloxane-based surfactant together with one or more of a nonionic surfactant, an anionic surfactant, and a zwitterionic surfactant. The aqueous firefighting compositions also include a polysaccharide thickener and an organic solvent, such as an alkylene glycol, glycerol and/or a glycol ether.

21 Claims, No Drawings

FIRE-FIGHTING FOAM CONCENTRATE WITH SILICONE SURFACTANT

CROSS-REFERENCE TO RELATED APPLICATIONS

This application is a U.S. National Stage Application of PCT/IB2021/051701, filed Mar. 1, 2021, which claims the benefit of and priority to U.S. Provisional Patent Application No. 63/000,698, filed Mar. 27, 2020, both of which are incorporated herein by reference in their entirety.

BACKGROUND

Firefighting foams are often able to fight Class A and Class B fires. Class A fires are those involving combustible material such as paper, wood, etc. and can be fought by quenching and cooling with large quantities of water or solutions containing water. Class B fires are those involving flammable liquid fuels, gasoline, and other hydrocarbons and are difficult to extinguish. Most flammable liquids exhibit high vapor pressure along with low fire and flash points. This typically results in a wide flammability range. In this type of fire, the use of water as the sole firefighting agent is generally ineffective because the only means of fighting fire with water is through cooling.

Conventional foam-forming firefighting compositions commonly include fluorinated and perfluorinated surfactants. Environmental concerns related to fluorinated and perfluorinated surfactants have developed. As a result, there is a strong desire in the marketplace to replace fluorinated and perfluorinated firefighting products with non-fluorinated products. There is therefore a continuing need to produce fluorine-free AFFF firefighting compositions that can be deployed to fight Class A and Class B fires.

SUMMARY

The present application is directed to aqueous compositions, which can be diluted with an aqueous diluent to provide a foam precursor composition, which may be aerated to form a firefighting foam. The present aqueous firefighting compositions include a surfactant mixture including a siloxane-based surfactant together with one or more of a nonionic surfactant, an anionic surfactant, and a zwitterionic surfactant. The aqueous firefighting compositions also include a polysaccharide thickener and an organic solvent, such as an alkylene glycol, glycerol and/or a glycol ether. In some embodiments, aqueous firefighting compositions includes a siloxane-based nonionic surfactant together with a mixture of a hydrocarbon-based nonionic surfactant, an anionic surfactant, and a zwitterionic surfactant. The siloxane-based nonionic surfactant may suitably include a water-dispersible, low foaming dimethicone derivative, such as a 3-(polyoxyethylene)-propylheptamethyltrisiloxane, e.g., PEG-4 dimethicone. In many instances, the aqueous firefighting foam composition contains no more than 0.01 wt. % fluorinated surfactant or other fluorinated additive. Often, the aqueous firefighting foam composition is completely free of any fluorinated surfactant or other fluorinated additive.

An exemplary embodiment provides an aqueous firefighting foam concentrate including a surfactant mixture containing one or more of an alkylpolyglycoside nonionic surfactant, an alkyl sulfate anionic surfactant, alkyl sulfonate anionic surfactant, and a zwitterionic surfactant; a siloxane-based surfactant, such as a nonionic polyether polysiloxane; an organic solvent, such as a glycol, glycerol and/or a glycol ether; and a polysaccharide thickener. The polysaccharide thickener commonly includes a polysaccharide that is soluble in the aqueous firefighting foam concentrate and a second polysaccharide that is insoluble in the concentrate but soluble in an aqueous firefighting foam precursor formed by diluting the concentrate with a much larger volume of an aqueous diluent, e.g., municipal water and/or salt water. The resulting firefighting foam precursor can then be aerated to provide a firefighting foam.

In an exemplary embodiment, the aqueous firefighting foam composition is a concentrate which includes a) a nonionic surfactant, such as an alkylpolyglycoside, b) an anionic surfactant, c) a zwitterionic surfactant, such as an alkylamidopropyl hydroxysultaine surfactant, an alkylamidoalkyl betaine surfactant and/or an alkyl betaine surfactant, d) a siloxane-based surfactant, such as a nonionic polyether polysiloxane, e) an organic solvent, which includes one or more of a glycol, glycerol and a glycol ether, f) a polysaccharide thickener and g) at least about 60 wt. % water. The polysaccharide thickener commonly includes a polysaccharide that is soluble in the aqueous firefighting foam concentrate and a second polysaccharide that is insoluble in the concentrate but soluble in an aqueous firefighting foam precursor formed by diluting the concentrate with a much larger volume of an aqueous diluent. The composition generally contains no more than 0.01 wt. % of the fluorinated surfactant and, often, is completely free of any fluorinated surfactant or other fluorinated additive.

An exemplary embodiment provide an aqueous firefighting foam concentrate including a) alkylpolyglycoside, b) an octyl sulfate and/or decyl sulfate salt, c) an alkylsulfobetaine surfactant and/or an alkylamidoalkyl hydroxysultaine surfactant, d) nonionic polyether siloxane, such as a PEG-4 silicone surfactant, e) diutan gum, f) xanthan gum, e) a mixture of propylene glycol and butyl carbitol, and f) at least about 65 wt. % water. The composition generally contains no more than 0.01 wt. % fluorinated surfactant and, often, is completely free of any fluorinated surfactant or other fluorinated additive.

An exemplary embodiment provides an aqueous firefighting foam concentrate including a) $C_{8-12}$-alkylpolyglycoside, b) $C_{8-10}$-alkylsulfate, c) alkylsulfobetaine, d) polyether siloxane, such as a PEG-4 silicone surfactant, e) polysaccharide gum, f) a mixture of an alkylene glycol and a glycol ether, such a butyl carbitol, and g) at least about 65 wt. % water. The combined amount of alkylene glycol and glycol ether is often about 5 to 20 wt. % and more commonly about 5 to 15 wt. % of the concentrate. The composition generally contains no more than 0.01 wt. % fluorinated surfactant and, often, is completely free of any fluorinated surfactant or other fluorinated additive.

An exemplary embodiment provides an aqueous firefighting foam concentrate including a) $C_{8-12}$-alkylpolyglycoside, b) $C_{8-10}$-alkyl sulfate salt, c) $C_{8-18}$-alkyl sulfobetaine surfactant, d) PEG-4 silicone surfactant, e) a mixture of propylene glycol and butyl carbitol, e.g., in a weight ratio of about 0.1:1 to 5:1, f) diutan gum, g) xanthan gum, and h) about 65 to 80 wt. % water. The composition generally contains no more than 0.01 wt. % of the fluorinated surfactant and, often, is completely free of any fluorinated surfactant or other fluorinated additive.

Another exemplary embodiment provides an aqueous firefighting foam concentrate including a) $C_{8-12}$-alkylpolyglycoside, b) $C_{8-10}$-alkyl sulfate salt, c) $C_{8-18}$-alkylamidopropyl hydroxysultaine surfactant, d) PEG-4 silicone surfactant, e) a mixture of propylene glycol and butyl carbitol, e.g., in a weight ratio of about 0.1:1 to 5:1, f) diutan gum, g) xanthan gum, and h) about 65 to 80 wt. % water. The composition generally contains no more than 0.01 wt. % of the fluorinated surfactant and, often, is completely free of any fluorinated surfactant or other fluorinated additive.

An exemplary embodiment provides an aqueous firefighting foam concentrate including a) a surfactant mixture comprising one or more of an alkylpolyglycoside surfactant, an alkyl sulfate and/or alkyl sulfonate anionic surfactant, and a zwitterionic surfactant, b) a siloxane-based surfactant, c) about 5-25 wt. % organic solvent including one or more of an alkylene glycol, glycerol and a glycol ether, d) at least about 60 wt. % water, and e) a polysaccharide thickener. In some embodiments, the aqueous firefighting foam composition may include about 0.5 to 5 wt. % of the siloxane-based surfactant. In some embodiments, the aqueous firefighting foam composition includes 5 to 15 wt. % of the organic solvent. In some embodiments, the aqueous firefighting foam composition includes about 0.5 to 15 wt. % and, more commonly, about 1 to 5 wt. % of the polysaccharide thickener. The composition generally contains no more than 0.01 wt. % of the fluorinated surfactant and, often, is completely free of any fluorinated surfactant or other fluorinated additive.

DETAILED DESCRIPTION

In one aspect, the aqueous firefighting foam compositions of the present disclosure include a) a surfactant mixture including one or more of a nonionic surfactant, an anionic surfactant, and a zwitterionic surfactant, b) a siloxane-based surfactant, c) organic solvent comprising one or more of an alkylene glycol, glycerol and a glycol ether, d) at least about 60 wt. % water, e) a polysaccharide thickener. In many instances, the aqueous firefighting foam composition contains no more than 0.01 wt. % fluorinated surfactant or other fluorinated additive. Often, the aqueous firefighting foam composition is completely free of any fluorinated surfactant or other fluorinated additive.

The nonionic surfactant typically includes an alkylpolyglycoside surfactant. The alkylpolyglycoside surfactant typically includes a $C_{8-12}$-alkylpolyglycoside and/or an alkylpolyglucoside. Suitable examples of the alkylpolyglycoside include a $C_{8-16}$-alkylpolyglycoside having an average degree of polymerization of about 1.3-2.0. Suitable examples of the alkylpolyglycoside include a $C_{9-11}$-alkylpolyglucoside, such as a $C_{9-11}$-alkylpolyglucoside having an average degree of polymerization of about 1.4-1.7. Commonly, the $C_{9-11}$-alkylpolyglucoside includes a nonyl, decyl and/or an undecyl polyglucoside. Other suitable examples of the alkylpolyglycoside include a $C_{8-10}$-alkylpolyglucoside. In embodiments that include the nonionic surfactant, the aqueous firefighting foam composition commonly includes about 2-6 wt. % of the nonionic surfactant. Typically, the aqueous firefighting foam composition may include about 2 to 10 wt. % and, in some instances about 4 to 8 wt. % of a nonionic surfactant, such as a $C_{8-12}$-alkylpolyglycoside. In some embodiments, the composition may contain about 3.8-5.7 wt. % of the nonionic surfactant.

The anionic surfactant typically includes an alkyl sulfate surfactant and/or an alkyl sulfonate surfactant. The alkyl sulfate surfactant typically includes include a $C_{8-12}$-alkyl sulfate salt. Suitable examples of the $C_{8-12}$-alkyl sulfate salt include a dodecyl sulfate salt, a decyl sulfate salt, an octyl sulfate salt, or a combination of any two or more thereof. In some embodiments, the alkyl sulfate salt includes an alkyl sulfate sodium salt, such as a sodium decyl sulfate, sodium octyl sulfate, or a combination thereof. In some embodiments, the alkyl sulfate salt includes an alkyl sulfate tertiary amine salt. In embodiments that include the anionic surfactant, the aqueous firefighting foam composition commonly includes about 2 to 8 wt. % of the anionic surfactant. Typically, the aqueous firefighting foam composition may include about 2 to 6 wt. % or about 2 to 5 wt. % of an anionic surfactant, such as a $C_{8-10}$-alkyl sulfate salt. In some embodiments, the composition may contain about 2.5 to 4 wt. % of an anionic surfactant.

The zwitterionic surfactant typically includes one or more of an alkylamidoalkyl betaine surfactant, an alkyl betaine surfactant and an alkylamidoalkylene hydroxysultaine surfactant, such as an alkylamidopropyl hydroxysultaine surfactant. Suitable examples of the alkylamidoalkylene hydroxysultaine surfactant include a $C_{8-18}$-alkylamidopropyl hydroxysultaine surfactant, such as a cocamidopropyl hydroxysultaine surfactant, which includes a laurylamidopropyl hydroxysultaine and a myristylamidopropyl hydroxysultaine. Suitable examples of the alkylamidoalkyl betaine surfactant include a $C_{8-18}$-alkylamidoalkyl betaine surfactant, such as a cocamidopropyl betaine, a tallowamidopropyl betaine, a laurylamidopropyl betaine or a myristylamidopropyl betaine. In embodiments that include the zwitterionic surfactant, the aqueous firefighting foam composition commonly includes about 2 to 8 wt. % of the zwitterionic surfactant. The aqueous firefighting foam composition may typically include about 3 to 6 wt. % of a zwitterionic surfactant, such as a cocamidopropyl hydroxysultaine. In some embodiments, the composition may contain about 3 to 5 wt. % of the zwitterionic surfactant.

The siloxane-based surfactant is commonly a nonionic surfactant and typically includes a polyether siloxane, such as a polyethoxylated polysiloxane. Polyether siloxanes, which are low foaming, can be particularly suitable for use in the present compositions. In some embodiments, the siloxane-based surfactant includes a nonionic polyether siloxane, such as a polyethoxylated polysiloxane, which is insoluble in water (at a concentration of 0.1 wt. %). In some embodiments, the polyether siloxane may include a water-dispersible polyethoxylated polysiloxane. Examples of suitable polyether siloxanes for use in the present compositions include low molecular weight ethoxylated polydimethylsiloxanes. Polydimethylsiloxane (PDMS) is also commonly referred to dimethylpolysiloxane or dimethicone (PDMS). The aqueous firefighting foam composition typically includes about 0.5 to 5 wt. % and, more commonly, about 1 to 3 wt. % of a siloxane-based surfactant, such as a polyether siloxane.

One suitable example of a polyether siloxane is PEG-4 dimethicone. The use of ethoxylated polydimethylsiloxanes, such as PEG-4 dimethicone, which are effective low foaming, wetting agents with excellent spreading capabilities, can be particularly advantageous for the present aqueous firefighting compositions. The inclusion of an ethoxylated polydimethylsiloxane, such as PEG-4 dimethicone, in the present compositions can improve foam expansion, prevent firefighting foam from picking up fuel from a covered fuel surface, exhibit superior fire suppression performance and/or enhance the spreading coefficient over a hydrocarbon fuel.

Another suitable example of a siloxane-based surfactant that may be used to form the present firefighting foam concentrate are water soluble, quaternary ammonium silicone surfactants. Such surfactants commonly have trialkyl ammonium groups attached either to the ends of the siloxane polymer and/or to internal siloxane subunits. The siloxane polymer backbone is typically a polydimethylsiloxane. The trialkyl ammonium groups may be connected to the polysiloxane by a hydroxy-functional alkylene ether linkage. Common trialkyl ammonium groups include trimethyl ammonium groups and $C_1$-$C_{18}$-dialkyl-methylammonium groups. One example of a water soluble, quaternary ammonium silicone surfactant is a polydimethylsiloxane having trimethyl ammonium groups attached to both ends of the polydimethylsiloxane by linkages that include a hydroxy-functional alkylene ether linkage. Another example of a water soluble, quaternary ammonium silicone surfactant is a polydimethylsiloxane having trimethyl ammonium groups attached to two or more internal siloxane subunits by linkages that include a hydroxy-functional alkylene ether linkage.

The aqueous firefighting foam composition includes a foam aid such as an organic solvent including one or more of an alkylene glycol, glycerol and a glycol ether. The alkylene glycol typically includes propylene glycol, or ethylene glycol. The glycol ether typically includes ethylene glycol monoalkyl ether, diethylene glycol monoalkyl ether, dipropylene glycol monoalkyl ether, triethylene glycol monoalkyl ether and 1-butoxyethoxy-2-propanol. In some embodiments, the organic solvent may include diethylene glycol n-butyl ether, dipropylene glycol n-propyl ether, hexylene glycol, ethylene glycol, dipropylene glycol, tripropylene glycol, dipropylene glycol monobutyl ether, dipropylene glycol monomethyl ether, ethylene glycol monobutyl ether, tripropylene glycol methyl ether, dipropylene glycol monopropyl ether, propylene glycol, glycerol, or a mixture of two or more thereof. In some embodiments, the organic solvent may be a mixture of alkylene glycol and glycol ether. In some embodiments, the organic solvent may be a mixture of propylene glycol and alkyl carbitol. In such embodiments, the organic solvent commonly includes alkylene glycol and alkyl carbitol in a weight ratio of about 0.1:1 to 5:1. In some embodiments, the organic solvent may be a mixture of propylene glycol and butyl carbitol. In some embodiments, the aqueous firefighting foam composition can include about 5 to 20 wt. % and, typically, about 5 to 15 wt. % of the organic solvent. In some embodiments, the organic solvent may include about 3 to 10 wt. % alkylene glycol and about 3 to 10 wt. % glycol ether, such as butyl carbitol.

The aqueous firefighting foam composition includes a thickener, such as a polysaccharide thickener. The polysaccharide thickener typically includes a first polysaccharide that is soluble in the aqueous firefighting foam composition and a second polysaccharide that is insoluble in the aqueous firefighting foam composition. In some embodiments, the second polysaccharide may be insoluble in the aqueous firefighting combustion but may be soluble in water alone.

The soluble polysaccharide may include xanthan gum. Commonly, the aqueous firefighting composition may include about 0.1 to 3 wt. % of the soluble polysaccharide. Typically, the aqueous firefighting composition may include about 0.1 to 1 wt. % of the soluble polysaccharide, such as xanthan gum.

The second polysaccharide may include agar, sodium alginate, carrageenan, gum arabic, gum guaicum, neem gum, pistacia lentiscus, gum chatti, caranna, galactomannan, gum tragacanth, karaya gum, guar gum, welan gum, rhamsam gum, locust bean gum, beta-glucan, cellulose, methylcellulose, chicle gum, kino gum, dammar gum, glucomannan, mastic gum, spruce gum, tara gum, pysllium seed husks, gellan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, and a mixture of two or more thereof. In some embodiments, the second polysaccharide may be diutan gum, guar gum, konjac gum, tarn gum and/or methylcellulose. In some embodiments, the second polysaccharide may be diutan gum. Commonly, the aqueous firefighting composition may include 3-12 wt. % of the second polysaccharide.

In an exemplary embodiment, the first polysaccharide includes xanthan gum and the second polysaccharide includes one or more of diutan gum, guar gum, konjac gum, tarn gum, and methylcellulose. In an exemplary embodiment, the aqueous firefighting composition includes about 0.1 to 1.0 wt. % of the first polysaccharide and about 0.5 to 10 wt. %, more commonly about 1 to 5 wt. %, of the second polysaccharide.

In an exemplary embodiment, the firefighting foam composition includes about 0.1 to 3 wt. % of the first polysaccharide, about 1 to 12 wt. % of the second polysaccharide, and the second polysaccharide is insoluble in the firefighting foam composition but soluble in water alone, typically as a much more dilute solution.

Small ethoxylated silicone surfactants can be used to improve spreading of foam over fuel. The hydrophilicity and lipophilicity balance may allow silicone surfactants with short ethoxylated chains to move the foam over the fuel or other flammable liquid without emulsifying the fuel into the foam. Xanthan gum, which is compatible with silicone surfactant packages, is expected to largely hydrate in such silicone surfactant modified aqueous solutions. The hydrated xanthan gum is expected to aid in suspending a larger amount of insoluble gum, such as diutan gum or konjac gum, to enable the resulting foam to improve the vapor barrier created on the surface of the fuel or other flammable liquid.

As discussed above, the aqueous firefighting foam composition includes water. In some embodiments, the water is water from a municipal water source (e.g., tap water). In some embodiments, the water is a purified water, such as purified water that meets the standards set forth in the United States Pharmacopeia, which is incorporated by reference herein in relevant part. In some embodiments, the aqueous firefighting foam composition includes at least about 60 wt. % water. In some embodiments, the aqueous firefighting foam composition includes greater than 60 wt. % water. In some embodiments, the aqueous firefighting foam composition may be produced using a source of water that has a total concentration of fluorine atoms on a weight percentage basis of no more than about 1 ppm F.

The aqueous firefighting foam compositions of the present disclosure are commonly substantially free of any fluorinated additives. As used herein, the "phrase substantially free of fluorinated additives" means that the aqueous firefighting foam composition includes no more than 0.01 wt. % of fluorinated additives. In some embodiments, the aqueous firefighting foam composition includes no more than 0.005 wt. % of fluorinated additives. The aqueous firefighting foam compositions of the present disclosure are substantially free of fluorine. As used herein, the phrase "substantially free of fluorine" means that the composition has a total concentration of fluorine atoms on a weight percentage basis of no more than about 1 part per million (ppm) F. The aqueous firefighting foam compositions of the present disclosure preferably include substantially less than 1 ppm F.

In some embodiments, the aqueous firefighting foam composition includes one or more chelators or sequestering buffers. Exemplary and non-limiting chelators and sequestering buffers include agents that sequester and chelate metal ions, including polyammopolycarboxylic acids, ethylenediaminetetraacetic acid, citric acid, tartaric acid, nitrilotriacetic acid, hydroxyethylethylenediaminetriacetic acid and salts thereof. Exemplary buffers include Sorensen's phosphate or McIlvaine's citrate buffers.

In some embodiments, the aqueous firefighting foam composition includes one or more corrosion inhibitors. Exemplary and non-limiting corrosion inhibitors includes ortho-phenylphenol, tolyltriazole, and phosphate ester acids. In some embodiments, the corrosion inhibitor is tolyltriazole.

In some embodiments, the aqueous firefighting foam composition includes one or more antimicrobial, biocidal, or preservatives. These components are included to prevent the biological decomposition of natural product based polymers that are incorporated as polymeric film formers (e.g., a polysaccharide gum). Examples include Kathon CG/ICP (Rohm & Haas Company), Givgard G-4 40 (Givaudan, Inc.), Dowicil 75 and Dowacide A (Dow Chemical Company). In some aspects, the biocidal agent is Dowacide A.

Tables 1 and 2 below provides illustration of suitable formulations of the present firefighting foam compositions designed to be combined with a diluent, aerated, and administered to fight a fire as a firefighting foam.

TABLE 1

| Ingredient | Amount (wt. %) |
|---|---|
| Biocide | 0.06-1.0 |
| Corrosion Inhibitor | 0.05-0.07 |
| DI Water | 60-85 |
| Zwitterionic Surfactant | 2-5 |
| Nonionic Surfactant | 2-6 |
| Anionic Surfactant | 2-4 |
| Organic Solvent | 5-15 |
| Polysaccharide Gum | 1-5 |
| Silicone Surfactant | 1-3 |

TABLE 2

| Ingredient | Amount (wt. %) |
|---|---|
| Biocide | 0.01-0.5 |
| Corrosion Inhibitor | 0.01-0.1 |
| DI Water | 60-85 |
| Zwitterionic Surfactant | 3-6 |
| Nonionic Surfactant | 3-8 |
| Anionic Surfactant | 2-6 |
| Organic Solvent | 5-20 |
| Polysaccharide Gum | 1-5 |
| Silicone Surfactant | 1-3 |

The aqueous firefighting compositions of the present disclosure may be substantially free of any fluorinated additives. As used herein, the "phrase substantially free of fluorinated additives" means that the aqueous firefighting composition includes no more than 0.01 wt. % of fluorinated additives. In some embodiments, the aqueous firefighting composition includes no more than 0.005 wt. % of fluorinated additives. The aqueous firefighting compositions of the present disclosure may be substantially free of fluorine in any form. As used herein, the phrase "substantially free of fluorine" means that the aqueous firefighting composition has a total concentration of fluorine atoms on a weight percentage basis of no more than about 1 ppm F.

EXAMPLES

The following examples more specifically illustrate formulations for preparing aqueous firefighting compositions according to various embodiments described above. These examples should in no way be construed as limiting the scope of the present technology.

Tables 3-6 below show the composition of a number of exemplary formulations of the present aqueous firefighting foam composition. The amounts shown in these tables represent the weight percentage of the particular component based on the total weight of the composition. The formulations include a) a surfactant mixture including a nonionic surfactant, an anionic surfactant, and a zwitterionic surfactant, b) a siloxane-based surfactant, c) organic solvent comprising one or more of an alkylene glycol, glycerol and a glycol ether, d) at least about 60 wt. % water; e) a polysaccharide thickener.

TABLE 3

| Ingredient | Amount (wt. %) |
|---|---|
| Biocide | 0.01-0.2 |
| Corrosion Inhibitor | 0.01-0.1 |
| Water | 65-80 |
| Alkylsulfobetaine | 3.3-5 |
| Alkylpolyglycoside | 3.8-5.7 |
| Octyl sulfate | 2.5-3.7 |
| Diutan Gum | 1.5-2.2 |
| Xanthan Gum | 0.2-0.4 |
| Propylene Glycol | 3.8-5.7 |
| Butyl Carbitol | 3.8-5.7 |
| PEG-4 Silicone Surfactant | 1.5-2.3 |

TABLE 4

| Ingredient | Amount (wt. %) |
|---|---|
| Biocide | 0.01-0.2 |
| Corrosion Inhibitor | 0.01-0.1 |
| Water | 65-80 |
| Alkylsulfobetaine | 2-5 |
| $C_{8-12}$-Alkylpolyglycoside | 2-6 |
| $C_{8-10}$-Alkyl sulfate | 2-4 |
| Polysaccharide Gum | 1-5 |
| Alkylene Glycol | 3-9 |
| Butyl Carbitol | 3-9 |
| Total Organic Solvent | 6-15 |
| PEG-4 Silicone Surfactant | 1-3 |

TABLE 5

| Ingredient | Amount (wt. %) |
|---|---|
| Biocide | 0.01-0.2 |
| Corrosion Inhibitor | 0.01-0.1 |
| Water | 60-80 |
| Alkylamidopropyl hydroxysultaine | 2-8 |
| Alkylpolyglycoside | 2-10 |
| Alkyl sulfate | 2-6 |
| Polysaccharide Gum | 1-5 |
| Alkylene Glycol | 3-9 |
| Glycol monoether | 3-9 |
| Nonionic polyether silicone | 1-3 |

TABLE 6

| Ingredient | Amount (wt. %) |
| --- | --- |
| Biocide | 0.01-0.2 |
| Corrosion Inhibitor | 0.01-0.1 |
| Water | 65-80 |
| Cocoamidopropyl hydroxysultaine | 2-8 |
| $C_{8-12}$-Alkylpolyglycoside | 2-10 |
| $C_{8-10}$-Alkyl sulfate | 2-6 |
| Diutan Gum | 1-3 |
| Xanthan Gum | 0.1-0.5 |
| Propylene Glycol | 3-9 |
| Butyl Carbitol | 3-9 |
| PEG-4 Silicone Surfactant | 1-3 |

The exemplary aqueous firefighting foam formulations shown in Tables 1-6 typically have a pH of about 7 to 9. Commonly, the formulations shown in Tables 1-6 have a pH of about 7.5 to 8.5. If necessary, a pH-adjusting agent may be added to a composition to achieve the desired pH range.

The exemplary aqueous firefighting foam formulations shown in Tables 1-6 typically have a viscosity of about 1,000 to 5,000 cps and, in some embodiments, may desirably have a viscosity of about 1,000 to 2,500 cps and, in some instances, about 1300 to 2100 cps (as determined at room temperature (75° F./24° C.) with a #4 spindle at 30 rpm).

Method of Producing a Firefighting Foam

The firefighting foam compositions described herein may be mixed with a diluent to form a use strength composition. The use strength formulation may be aerated (e.g., using a nozzle) to produce a firefighting foam including the firefighting foam composition and the diluent. Exemplary diluents may include water including fresh water, brackish water, sea water, and combinations thereof. In some embodiments, the firefighting foam compositions described above may be 1 vol. %, 3 vol. %, or 5 vol. % concentrate solutions, meaning that the firefighting foam compositions are mixed with 99 vol. %, 97 vol. %, or 95 vol. % diluent, respectively, to form the firefighting foam.

Method of Fighting a Fire

The firefighting foam compositions described herein may be used to fight a fire by mixing the firefighting foam compositions with a diluent, aerating the firefighting foam composition and diluent to form a firefighting foam, and administering the firefighting foam to a fire.

Illustrative Embodiments

Reference is made to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials, and compositions described herein.

In an exemplary embodiment, the aqueous firefighting foam composition includes a) about 2 to 6 wt. % of the nonionic surfactant, b) about 2 to 5 wt. % of the anionic surfactant, c) about 2 to 5 wt. % of the zwitterionic surfactant, d) about 1 to 3 wt. % of the siloxane-based surfactant, e) about 5 to 15 wt. % of the organic solvent, f) at least about 60 wt. % water, and g) a polysaccharide thickener. The composition commonly contains no more than 0.01 wt. % of the fluorinated surfactant or other fluorinated additive.

In an exemplary embodiment, the aqueous firefighting foam composition includes a) about 3.8 to 5.7 wt. % alkylpolyglycoside, b) about 2.5 to 3.7 wt. % octyl sulfate salt, c) about 3.3 to 5 wt. % alkylsulfobetaine, d) about 1.5 to 2.3 wt. % PEG-4 silicone surfactant, e) about 1.5 to 2.2 wt. % diutan gum, f) about 0.2 to 0.4 wt. % xanthan gum, e) about 3.8 to 5.7 wt. % propylene glycol and about 3.8 to 5.7 wt. % butyl carbitol, and f) at least about 65 wt. % water. The composition commonly contains no more than 0.01 wt. % fluorinated surfactant or other fluorinated additive.

In an exemplary embodiment, the aqueous firefighting foam composition includes a) about 2 to 6 wt. % alkylpolyglycoside, b) about 2 to 4 wt. % $C_{8-10}$-alkyl sulfate salt, c) about 2 to 5 wt. % alkylsulfobetaine, d) about 1 to 3 wt. % PEG-4 silicone surfactant, e) about 1 to 5 wt. % polysaccharide gum, f) about 3 to 9 wt. % alkylene glycol and about 3 to about 9 wt. % butyl carbitol, and g) at least about 65 wt. % water. A combined amount of alkylene glycol and butyl carbitol is from about 5 to 15 wt. % of the composition. The composition typically contains no more than 0.01 wt. % fluorinated surfactant or other fluorinated additive.

In an exemplary embodiment, the aqueous firefighting foam composition includes a) about 0.2 to 3 wt. % $C_{8-12}$-alkylpolyglycoside, b) about 2 to 4 wt. % $C_{8-10}$-alkyl sulfate salt, c) about 3 to 5 wt. % $C_{8-18}$-alkyl sulfobetaine surfactant, d) about 1 to 3 wt. % PEG-4 silicone surfactant, e) about 5 to 15 wt. % of a mixture of propylene glycol and butyl carbitol in a weight ratio of about 0.1:1 to 5:1, f) about 1 to 3 wt. % diutan gum, g) about 0.1 to 0.5 wt. % xanthan gum, and h) about 65 to 80 wt. % water. The composition typically contains no more than 0.01 wt. % fluorinated surfactant or other fluorinated additive.

In an exemplary embodiment, the aqueous firefighting foam composition includes a) about 2 to 10 wt. % of the nonionic surfactant; b) about 2 to 6 wt. % of the anionic surfactant; c) about 2 to 8 wt. % of the zwitterionic surfactant; d) about 1 to 3 wt. % of the siloxane-based surfactant; e) about 5 to 15 wt. % of the organic solvent; and d) about 60 to 80 wt. % water. The composition typically contains no more than 0.01 wt. % fluorinated surfactant or other fluorinated additive. Often, the aqueous firefighting foam composition is completely free of any fluorinated surfactant or other fluorinated additive.

In an exemplary embodiment, the aqueous firefighting foam composition includes a) about 4 to 8 wt. % $C_{8-12}$-alkylpolyglycoside; b) about 2 to 5 wt. % octyl sulfate salt; c) about 3 to 6 wt. % cocoamidopropyl hydroxysultaine; d) about 1 to 3 wt. % PEG-4 silicone surfactant; e) about 1 to 3 wt. % diutan gum; f) about 0.1 to 0.5 wt. % xanthan gum; e) about 3 to 9 wt. % propylene glycol and about 3 to 9 wt. % butyl carbitol; and f) at least about 65 wt. % water. The composition typically contains no more than 0.01 wt. % fluorinated surfactant or other fluorinated additive. Often, the aqueous firefighting foam composition is completely free of any fluorinated surfactant or other fluorinated additive.

In an exemplary embodiment, the aqueous firefighting foam composition includes a) about 2 to 10 wt. % alkylpolyglycoside; b) about 2 to 6 wt. % $C_{8-10}$-alkyl sulfate salt; c) about 2 to 8 wt. % alkylamidopropyl hydroxysultaine; d) about 1 to 3 wt. % nonionic polyether silicone surfactant; e) about 1 to 5 wt. % polysaccharide gum; f) about 2 to 9 wt. % alkylene glycol and about 2 to about 9 wt. % butyl carbitol, wherein the combined amount of alkylene glycol and butyl carbitol is from about 5 to 15 wt. % of the composition; and g) at least about 65 wt. % water. The composition typically contains no more than 0.01 wt. % fluorinated surfactant or other fluorinated additive. Often, the aqueous firefighting foam composition is completely free of any fluorinated surfactant or other fluorinated additive.

In an exemplary embodiment, the aqueous firefighting foam composition includes a) about 2 to 10 wt. % $C_{8-12}$-alkylpolyglycoside; b) about 2 to 6 wt. % $C_{8-10}$-alkyl sulfate salt; c) about to 5 wt. % $C_{8-18}$-alkylamidopropyl hydroxysultaine surfactant; d) about 1 to 3 wt. % PEG-4 silicone surfactant; e) about 5 to 15 wt. % of a mixture of propylene glycol and butyl carbitol in a weight ratio of about 0.1:1 to 5:1; f) about 1 to 3 wt. % diutan gum; g) about 0.1 to 0.5 wt. % xanthan gum; and h) about 65 to 80 wt. % water. The composition typically contains no more than 0.01 wt. % fluorinated surfactant or other fluorinated additive. Often, the aqueous firefighting foam composition is completely free of any fluorinated surfactant or other fluorinated additive.

While certain embodiments have been illustrated and described, it should be understood that changes and modifications can be made therein in accordance with ordinary skill in the art without departing from the technology in its broader aspects.

The embodiments illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expression of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "and" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Additionally, where features or aspects of the disclosure are described in terms of Markush groups, those skilled in the art will realize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof.

What is claimed is:

1. An aqueous firefighting foam composition comprising:
    a) a surfactant mixture comprising a hydrocarbon nonionic surfactant, an anionic surfactant, and a zwitterionic surfactant;
    b) polyethyleneglycol-4 dimethicone;
    c) an organic solvent comprising one or more of an alkylene glycol, glycerol, and a glycol ether;
    d) at least about 60 wt. % water; and
    e) a polysaccharide thickener.

2. The composition of claim 1 comprising
    a) about 5 to 20 wt. % of the surfactant mixture;
    b) about 0.5 to 5 wt. % of the polyethyleneglycol-4 dimethicone;
    c) about 5 to 20 wt. % of the organic solvent; and
    d) about 1 to 5 wt. % of the polysaccharide thickener.

3. The composition of claim 1, wherein the organic solvent comprises an alkylene glycol, a glycol ether, or a mixture of an alkylene glycol and a glycol ether.

4. The composition of claim 3, wherein the organic solvent comprises propylene glycol, an alkyl carbitol, or a mixture of propylene glycol and an alkyl carbitol.

5. The composition of claim 4, wherein the alkyl carbitol is butyl carbitol.

6. The composition of claim 1, wherein the zwitterionic surfactant comprises one or more of an alkylamidopropyl hydroxysultaine surfactant, an alkylamidoalkyl betaine surfactant, and an alkyl betaine surfactant.

7. The composition of claim 1, wherein the nonionic surfactant comprises an alkylpolyglycoside.

8. The composition of claim 1, wherein the anionic surfactant comprises an alkyl sulfate salt, an alkyl sulfonate salt, or a mixture of an alkyl sulfate salt and an alkyl sulfonate salt.

9. The composition of claim 1, wherein the polysaccharide thickener comprises first polysaccharide that is soluble in the composition and a second polysaccharide that is insoluble in the composition.

10. The composition of claim 9, wherein the composition includes about 0.1 to 1.0 wt. % of the first polysaccharide; and about 1 to 12 wt. % of the second polysaccharide.

11. The composition of claim 9, wherein the first polysaccharide comprises xanthan gum; and the second polysaccharide comprises one or more of diutan gum, guar gum, konjac gum, tarn gum, and methylcellulose.

12. The composition of claim 9, wherein the composition comprises 0.1 to 0.5 wt. % of the first polysaccharide; and 1 to 5 wt. % of the second polysaccharide.

13. The composition of claim 1, wherein the organic solvent comprises diethylene glycol n-butyl ether, dipropylene glycol n-propyl ether, hexylene glycol, ethylene glycol, dipropylene glycol, tripropylene glycol, dipropylene glycol monobutyl ether, dipropylene glycol monomethyl ether, ethylene glycol monobutyl ether, tripropylene glycol methyl ether, dipropylene glycol monopropyl ether, propylene glycol, glycerol, or a mixture of two or more thereof.

14. The composition of claim 1, wherein the zwitterionic surfactant comprises an alkylsulfobetaine surfactant.

15. The composition of claim 1, wherein the composition is substantially free of any fluorinated additives.

16. The composition of claim 1, comprising:
a) about 4 to 8 wt. % $C_{8-12}$-alkylpolyglycoside;
b) about 2 to 5 wt. % octyl sulfate salt;
c) about 3 to 6 wt. % cocamidopropyl hydroxysultaine;
d) about 1 to 3 wt. % polyethyleneglycol-4 dimethicone;
e) about 1 to 3 wt. % diutan gum;
f) about 0.1 to 0.5 wt. % xanthan gum;
g) about 3 to 9 wt. % propylene glycol and about 3 to 9 wt. % butyl carbitol; and
h) at least about 65 wt. % water;
wherein the composition contains no more than 0.01 wt. % fluorinated surfactant.

17. The composition of claim 1, comprising:
a) about 2 to 10 wt. % alkylpolyglycoside;
b) about 2 to 6 wt. % $C_{8-10}$-alkyl sulfate salt;
c) about 2 to 8 wt. % alkylamidopropyl hydroxysultaine;
d) about 1 to 3 wt. % polyethyleneglycol-4 dimethicone;
e) about 1 to 5 wt. % polysaccharide gum;
f) about 2 to 9 wt. % alkylene glycol and about 2 to about 9 wt. % butyl carbitol, wherein a combined amount of alkylene glycol and butyl carbitol is from about 5 to 15 wt. % of the composition; and
g) at least about 65 wt. % water;
wherein the composition contains no more than 0.01 wt. % fluorinated surfactant.

18. The composition of claim 1, comprising:
a) about 2 to 10 wt. % $C_{8-12}$-alkylpolyglycoside;
b) about 2 to 6 wt. % $C_{8-10}$-alkyl sulfate salt;
c) about 2 to 8 wt. % $C_{8-18}$-alkylamidopropyl hydroxysultaine surfactant;
d) about 1 to 3 wt. % polyethyleneglycol-4 dimethicone;
e) about 5 to 15 wt. % of a mixture of propylene glycol and butyl carbitol in a weight ratio of about 0.1:1 to 5:1;
f) about 1 to 3 wt. % diutan gum;
g) about 0.1 to 0.5 wt. % xanthan gum; and
h) about 65 to 80 wt. % water;
wherein the composition contains no more than 0.01 wt. % fluorinated surfactant.

19. The composition of claim 1, wherein the composition contains no more than 0.005 wt. % fluorinated additives.

20. A method of forming a firefighting foam, the method comprising:
mixing the firefighting foam composition of claim 1 with water to form a use strength solution; and aerating the use strength solution to form the firefighting foam.

21. An aqueous firefighting composition comprising:
a) a surfactant mixture comprising one or more of an alkylpolyglycoside surfactant, an alkyl sulfate and/or alkyl sulfonate anionic surfactant, and a zwitterionic surfactant;
b) polyethyleneglycol-4 dimethicone;
c) about 5-25 wt. % solvent comprising one or more of an alkylene glycol, glycerol and a glycol ether;
d) at least about 60 wt. % water; and
e) a polysaccharide thickener.

* * * * *